(12) United States Patent
Yang et al.

(10) Patent No.: US 6,842,928 B2
(45) Date of Patent: Jan. 18, 2005

(54) APPARATUS AND METHOD FOR DETECTING LAUNDRY WEIGHT IN WASHING MACHINE EMPLOYING SENSORLESS BLDC MOTOR

(75) Inventors: Soon Bae Yang, Seoul (KR); Kwan Yeul Cho, Seoul (KR); Chan Hee Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 10/013,702

(22) Filed: Dec. 13, 2001

(65) Prior Publication Data

US 2003/0009832 A1 Jan. 16, 2003

(30) Foreign Application Priority Data

Jul. 10, 2001 (KR) .......................................... 2001/41260

(51) Int. Cl.[7] .............................................. D06F 33/00
(52) U.S. Cl. .................................... 8/159; 68/12.04
(58) Field of Search ...................... 8/158, 159; 68/12.04

(56) References Cited

U.S. PATENT DOCUMENTS

| | | | | |
|---|---|---|---|---|
| 4,862,710 A | * | 9/1989 | Torita et al. ............... | 68/12.04 |
| 5,161,393 A | * | 11/1992 | Payne et al. ............... | 68/12.04 |
| 5,298,838 A | * | 3/1994 | Peters et al. ............... | 318/138 |
| 5,507,054 A | * | 4/1996 | Blauert et al. .............. | 8/159 |
| 6,163,912 A | * | 12/2000 | Matsuura et al. ........... | 8/159 |
| 6,374,444 B2 | * | 4/2002 | Skrippek et al. ........... | 8/159 |
| 6,550,290 B2 | * | 4/2003 | Shimakage et al. ........ | 68/12.04 |

FOREIGN PATENT DOCUMENTS

| | | |
|---|---|---|
| JP | 63-294898 | 12/1988 |
| JP | 05-277282 | 10/1993 |
| JP | 05-344741 | 12/1993 |
| JP | 09-206489 | 8/1997 |
| JP | 09-239189 | 9/1997 |

* cited by examiner

Primary Examiner—Frankie L. Stinson
Assistant Examiner—Joseph Perrin
(74) Attorney, Agent, or Firm—Fleshner & Kim, LLP (57) ABSTRACT

An improved method for detecting a laundry weight in a washing machine employing a sensorless BLDC motor is provided. The motor is rotated until the washer reaches a first speed. The washer then operates in a torque control mode for a predetermined amount of time, and a laundry weight is then determined based on a speed of the motor after the predetermined amount of time has elapsed. In this manner, laundry weight can be accurately determined and the laundry can be effectively washed. Additionally, since a washing machine employing this improved method for detecting does not require a hall sensor and its peripheral circuit manufacture is simplified, and thus cost may be reduced.

17 Claims, 6 Drawing Sheets

APPARATUS AND METHOD FOR DETECTING LAUNDRY WEIGHT IN WASHING MACHINE EMPLOYING SENSORLESS BLDC MOTOR

BACKGROUND OF THE INVENTION

1. Field of the Invention

The present invention relates to an apparatus and method for detecting a laundry weight in a washing machine employing a sensorless BLDC motor, and more particularly, to an apparatus and method for detecting a laundry weight in a washing machine employing a sensorless BLDC motor that is capable of detecting a laundry weight in a dry state by using a motor speed difference according to a laundry weight.

2. Description of the Background Art

Recently, in order to improve a washing degree of the laundry and reduce a noise and an energy of a washing machine, an inverter unit which is able to variably control freely a motor speed has been adopted to a washing machine, and in addition to this, in order to adjust a water level and a detergent amount, a method for detecting a laundry weight (a weight of the laundry) in a washing machine has been adopted.

Figure 1:
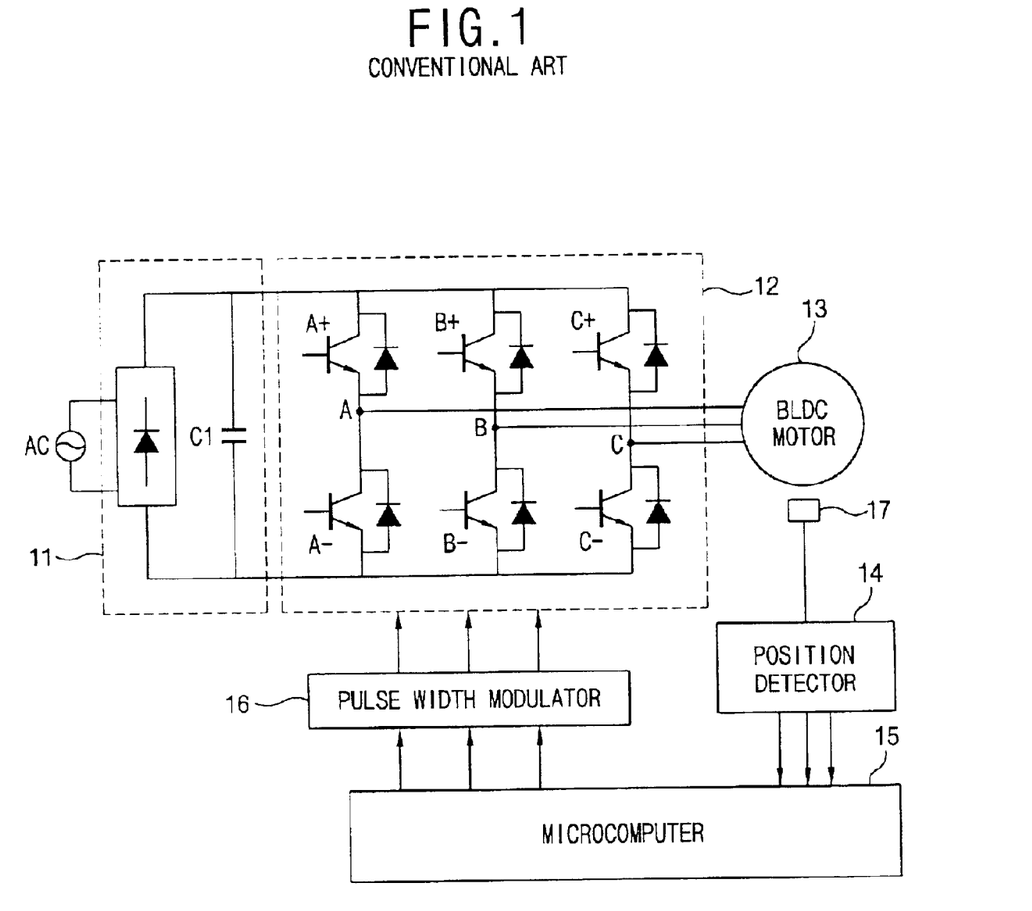
FIG. 1 is a circuit diagram showing a driving apparatus of a BLDC motor in accordance with a conventional art.

FIG. 1 is a circuit diagram showing a driving device of a BLDC motor in accordance with a conventional art.

As shown in FIG. 1, the driving device includes a rectifying unit 11 for rectifying and smoothing an AC power, an inverter unit 12 for applying the rectified and smoothed voltage and current to a BLDC motor 13 and controlling the speed of a rotor (not shown) of the motor; a position detector 14 for detecting a position of a rotor of the motor 13 by using a hall unit 17 attached at the motor 13; a microcomputer 15 for receiving a position detect signal from the position detector 14 and controlling the speed of the motor 13; and a pulse width modulator 16 for receiving a control signal from the microcomputer 15, modulating an output pulse width and controlling the inverter unit 12.

The conventional driving device of the BLDC motor constructed as described above will now be explained.

When the rectifier 11 rectifies and smoothes an input AC power and applies it to the inverter unit 12, the inverter unit 12 receives a drive signal from the pulse width modulator 16 and applies a three-phase voltage to the motor 13.

Accordingly, the motor 13 starts rotating. At this time, the position detector 14 detects a position of the rotor of the motor 13 by using the hall unit 17 attached at the motor 13, and inputs a voltage value according to the detected position value to the microcomputer 15.

The microcomputer 15 computes the speed of the motor 13 with the voltage value, compares it with a pre-set reference speed, and outputs a control signal for rotating the motor 13 at a desired speed to the pulse width modulator 16.

Upon receipt of the control signal from the microcomputer 15, the pulse width modulator 16 converts a level of the control signal and outputs it to the inverter unit 12.

There are two methods for detecting a laundry weight by using the BLDC motor.

The first one is a method that the motor 13 is accelerated to a certain speed for a predetermined time period and then a power is cut off so as to check a rate at which the speed of the motor 13 is decelerated, to thereby measure a laundry weight. That is, in this method, the inertia of the motor 13 according to the laundry weight is measured to detect the laundry weight. This method is mostly adopted to a washing machine in which a pulsator (not shown) reduces a rotational force of the motor 13 or changes a direction of the motor by a clutch and a gear.

The second one is a method that time during which the motor 13 reaches a certain speed is measured. In this method, since the motor 13 is directly connected to the pulsator (not shown) or an inner tub (not shown) and driven, this method is useful for a washing machine adopting a direct driving method.

The laundry weight detecting method adopted to a washing machine of the direct driving method will now be described with reference to FIGS. 2A through 2E.

Figure 2A:
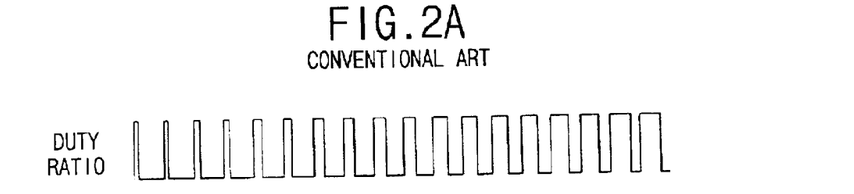
FIG. 2A is a wave form showing a gradually increased duty ratio for detecting a laundry weight of FIG. 1 in accordance with the conventional art.

After the motor 13 is aligned at a certain position at the initial stage, the size of the voltage applied to the motor 13 is regularly increased.

That is, as shown in FIG. 2A, a duty ratio (an ON/OFF ratio of 6 transistor switches of the inverter unit 12) is controlled so as to be proportionate to the size of a voltage corresponding to each phase, thereby increasing the size of the voltage.

Thereafter, when the microcomputer 15 regularly increases the phase voltage applied to the motor 13, the speed of the inner tub directly connected to the motor 13 or the pulsator is gradually increased.

Figure 2B:
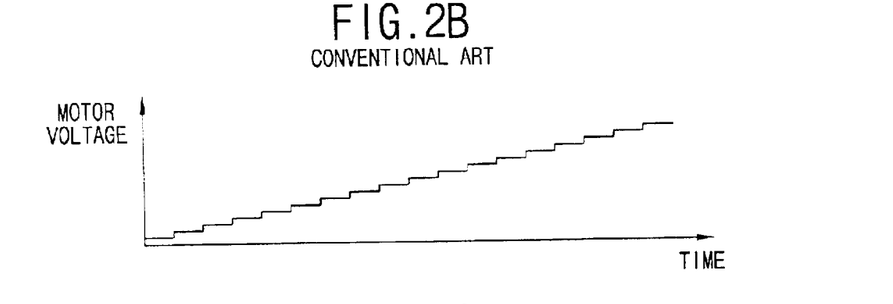
FIG. 2B is a graph showing that a voltage applied to a motor is increased as time elapses in accordance with the conventional art.
Figure 2C:
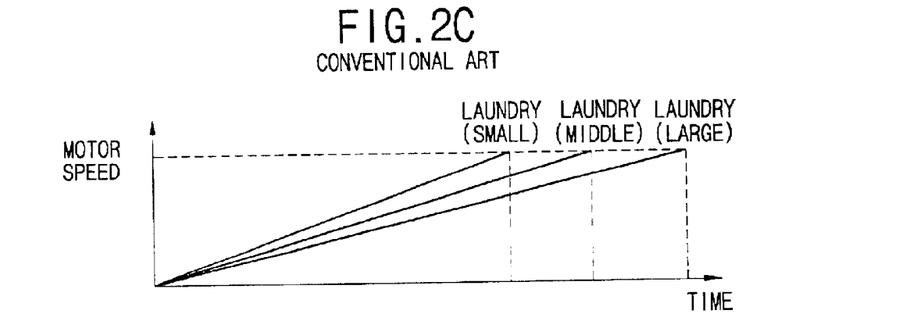
FIG. 2C is a graph showing time during which the speed of the motor according to a laundry weight reaches a reference speed in accordance with the conventional art.
Figure 2D:
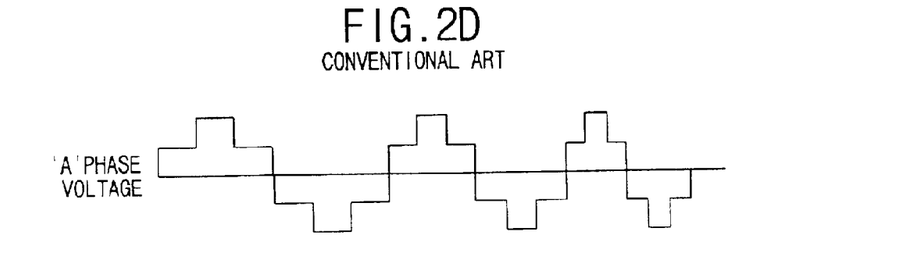
FIG. 2D is a wave form showing an 'A' phase voltage of an inverter unit and that the period becomes fast through a switching manipulation of the inverter unit in accordance with the conventional art.
Figure 2E:
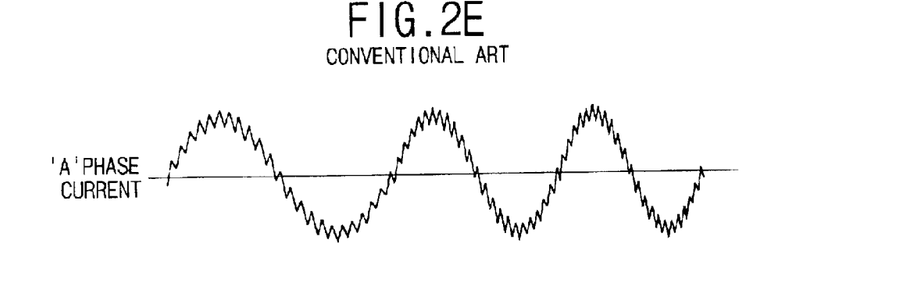
FIG. 2E is a wave form showing a 'A' phase current of the inverter unit in accordance with the conventional art.

In the case that the speed is increased, as shown in FIG. 2B, if there is much laundry weight compared to the reference laundry weight, the motor 13 should generate more torque, so that more time is taken for the motor 13 or the inner tub to reach the reference speed or the reference position than the reference time.

Thus, during the time when a certain torque is applied to the motor 13, if the laundry weight is more than the reference laundry weight, the motor 13 or the inner tub reaches the reference speed or the reference position after the reference time elapse.

Conversely, if the laundry weight is small, the motor 13 or the inner tub reaches the reference speed or the reference position in a shorter time than the reference time.

After a certain voltage is applied to the motor 13, the time during which the motor 13 or the inner tub reaches a certain speed or a certain position is computed, to thereby detect the laundry weight.

However, in the laundry weight detecting method, there are many factors affecting the accuracy of the detected laundry weight, including a mechanical factor such as a deviation of a bearing housing, a vibration difference of the inner tub, a deviation of a damper, a motor factor such as a resistance of the motor 13 or the inductance, and a control circuit factor such as a voltage detect circuit, a voltage variation or a temperature. Among them, the error in the voltage detection according to a power supply voltage variation is the factor that has the biggest influence on detecting of the laundry weight in a washing machine.

As shown in FIGS. 3A through 3D, if power is much used around the washing machine, the size of the power supply voltage inputted to the washing machine is reduced, and a DC link terminal voltage of the inverter unit 12 is varied depending on a limited capacity of a condenser according to the laundry weight and the operation speed in driving the washing machine.

Figure 3A:
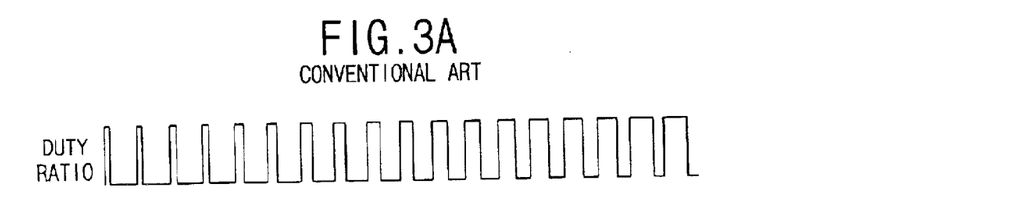
FIG. 3A is a wave form showing a variation of a duty ratio according to an ON/OFF operation of a gate drive signal in the inverter unit in accordance with the conventional art.
Figure 3B:
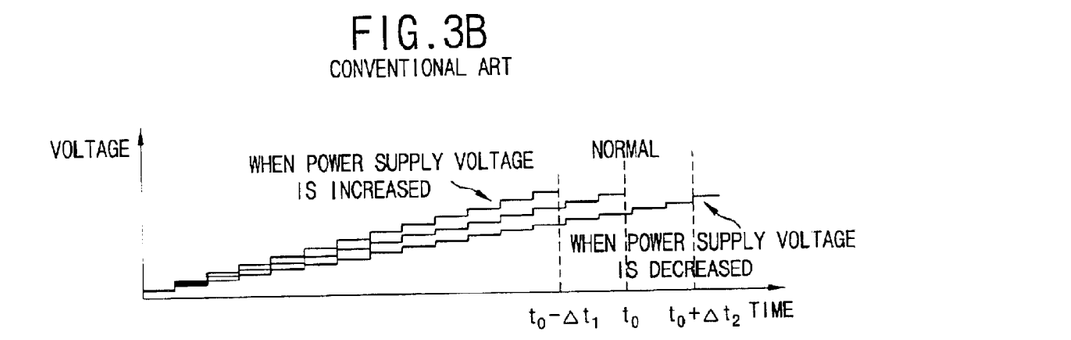
FIGS. 3B and 3C are graphs showing that time during which an average voltage applied to the motor reaches a reference speed becomes different depending on the variation of a power supply voltage.
Figure 3C:
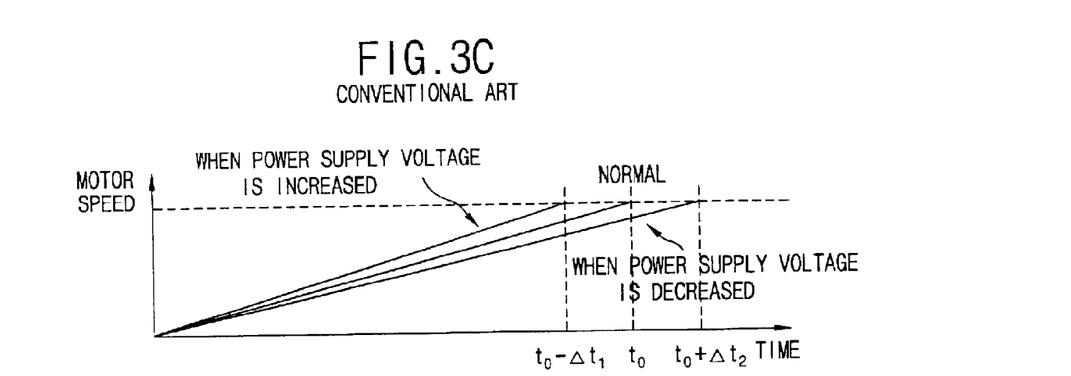
Figure 3D:
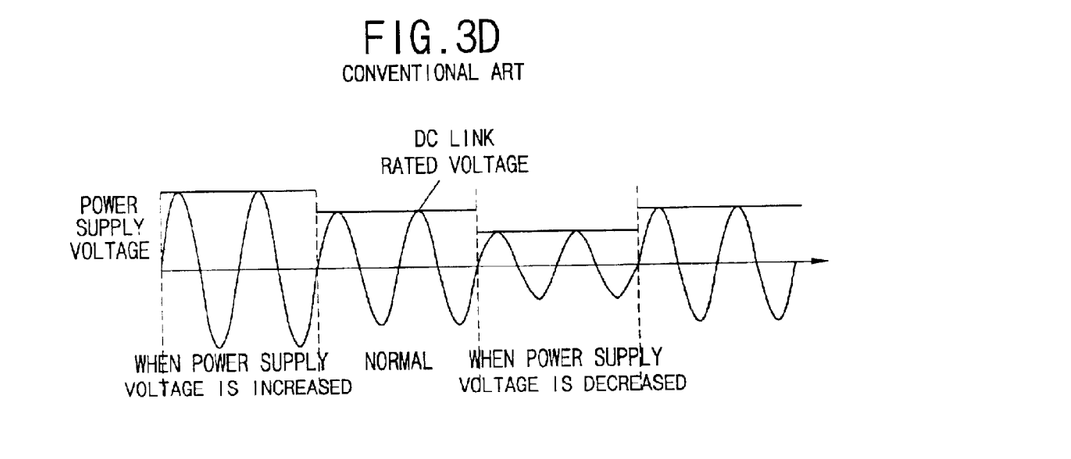
FIG. 3D is a wave form showing a variation of the power supply voltage and change in a voltage of a DC link terminal.

Thus, it is difficult to detect the accurate number of rotation of the motor 13 at the initial stage. In addition, as shown in FIG. 3B, in detecting the laundry weight, if the power supply voltage is increased higher than the reference voltage, since the motor speed reaches the reference speed fast as much as $\Delta t$, than $\Delta t_0$, a laundry detection error occurs corresponding to the time $\Delta t_1$.

Conversely, if the power supply voltage is reduced lower than the reference voltage, since it reaches the reference speed as much as $\Delta t_2$, it is detected that there is more laundry corresponding to the time $\Delta t_2$.

Therefore, the method for detecting the laundry weight with the time during which the motor speed reaches the reference speed or the reference position has the following problem.

That is, in order to accurately compute the laundry weight, a certain voltage should be applied regardless of the laundry weight or the surroundings, but if a certain voltage fails to be applied to the motor due to the surroundings, a computed laundry weight may differ from an actual value.

SUMMARY OF THE INVENTION

Therefore, an object of the present invention is to provide a method for detecting a laundry weight that is capable of accurately measuring a laundry weight and effectively washing a laundry without a necessity of accurately detecting the number of rotation of a motor in an environment that a voltage is not regularly applied in detecting the laundry weight.

Another object of the present invention is to provide an apparatus for detecting a laundry weight that is capable of reducing a unit cost with a simple construction by not installing a hall sensor and its peripheral circuit in a washing machine employing a BLDC motor.

To achieve these and other advantages and in accordance with the purpose of the present invention, as embodied and broadly described herein, there is provided a method for detecting a laundry weight in a washing machine employing a sensorless BLDC motor including the steps of: determining whether a first predetermined time elapses after a motor is initiated and reaches a certain speed; and controlling the motor in a torque control mode when the first predetermined time elapses and detecting a laundry weight on the basis of the motor speed after a second predetermined time elapses.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
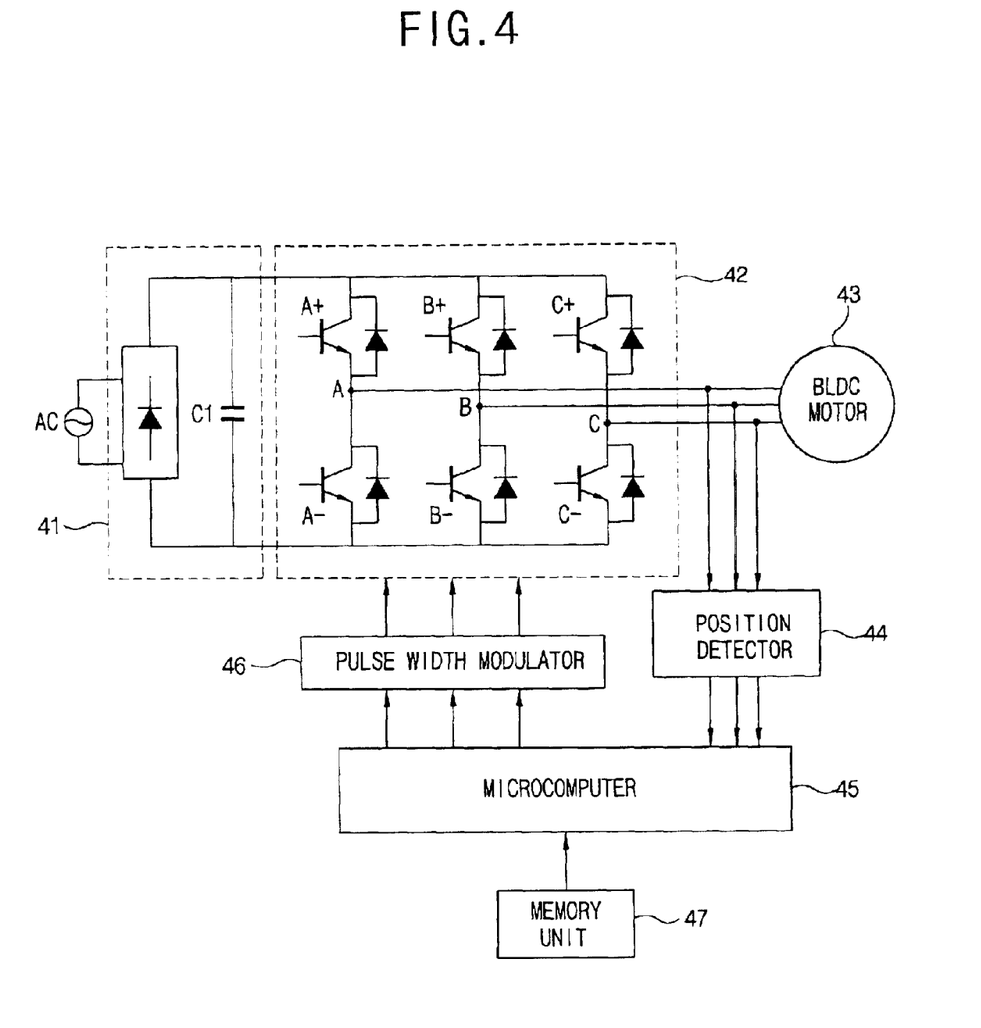
FIG. 4 is a circuit diagram showing a driving apparatus of a sensorless BLDC motor in accordance with a preferred embodiment of the present invention.

FIG. 4 is a circuit diagram showing a driving apparatus of a sensorless BLDC motor in accordance with a preferred embodiment of the present invention.

As shown in FIG. 4, a driving apparatus of a sensorless BLDC motor includes: a rectifying unit 41 for rectifying and smoothing an AC power; an inverter unit 42 for applying the rectified and smoothed voltage and current to a BLDC motor 43 and controlling a speed of a rotor (not shown) of the motor 43; a position detecting unit 44 for detecting the current applied to the motor 43 and detecting a position of the rotor of the motor 43; a microcomputer 45 for receiving the position detect signal detected by the position detecting unit 44 and controlling the speed of the motor 43; a memory unit 47 for storing the speed value of the motor 43 output from the microcomputer 45; and a pulse width modulating unit 46 for receiving a control signal from the microcomputer, modulating an output pulse width and controlling the inverter unit 42.

Figure 5:
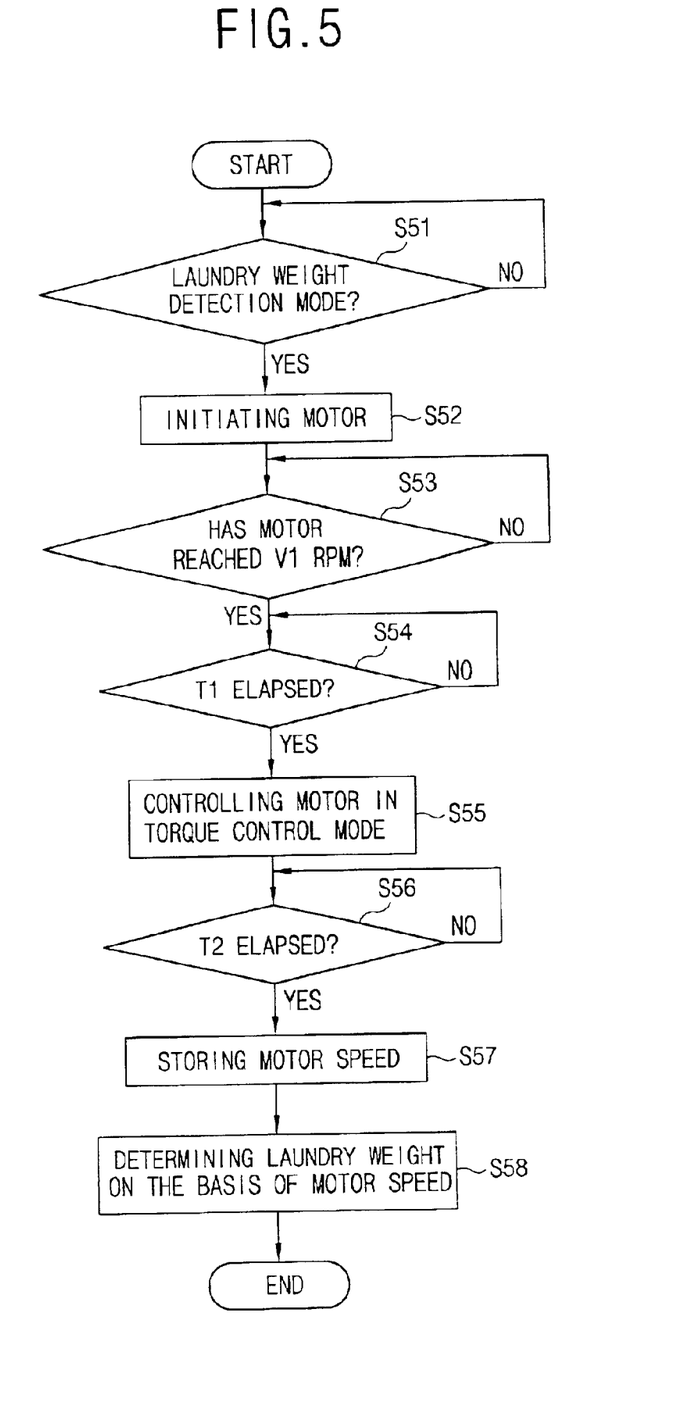
FIG. 5 is a flow chart of a method for detecting a laundry weight in a washing machine employing a sensorless BLDC motor in accordance with the preferred embodiment of the present invention.
Figure 6:
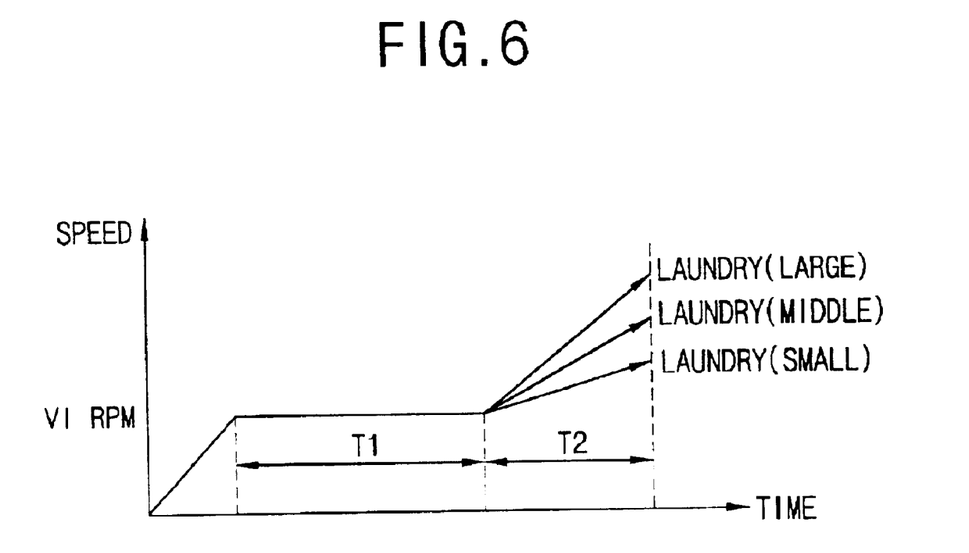
FIG. 6 is a graph showing a drive pattern for detecting a laundry weight in a washing machine employing the sensor BLDC motor in accordance with the preferred embodiment of the present invention.

An apparatus and method for detecting a laundry weight in a washing machine employing the sensorless BLDC motor 43 of the present invention will now be described on the basis of the driving apparatus of the sensorless BLDC motor (referred to as 'motor', hereinafter) with reference to FIGS. 4 through 6.

After a user puts the laundry in the inner tub (not shown), he or she depresses a washing start button. Then, the microcomputer 45 recognizes it and turns on a transistor of the inverter unit 42 to rotate the motor 43, in order to detect a laundry weight (steps S51~S52).

When the motor 43 starts rotating, since an error is generated in a position detection and it is difficult to accurately control a torque, a laundry weight detecting time is divided into an interval that the motor 43 is driven at a certain speed (that is, time (T1) for which a position detection error can be disregarded) and an interval (T2) for accelerating the motor 43.

Thereafter, when it passes the interval at which the motor 43 is accelerated, an accurate laundry weight is determined on the basis of the difference of a speed according to a laundry weight.

In other words, when the motor 43 starts rotating, the microcomputer 45 periodically turns on and off the remaining transistors by means of the pulse width modulating unit 45 until the motor 43 reaches the certain speed (V1 RPM).

When the motor 43 reaches the certain speed (V1 RPM (revolutions per minute)), the microcomputer 45 drives the motor 43 at the certain speed (V1 RPM) for a predetermined time (T1) (step S53).

At the initial stage of driving the motor 43, substantially, an error may be generated in the position detection, and especially, an error in a current and a voltage applied to the motor 43 and a position detection error computed on the basis of the current and the voltage signal can be relatively large.

Then, the microcomputer 45 would fail to perform an accurate torque control, and even if it performs the torque control, it would fail to accurately measure the laundry weight according to the speed difference of the motor 43.

In addition, although the motor is driven at a speed that the position of the rotor of the motor 43 is stable, since the speed is not constant due to the acceleration characteristic of the motor 43, the speed needs to be maintained for a predetermined time to a degree that the position detection error can be disregarded (step S54).

In this respect, the certain speed (V1 rpm) and the predetermined time (T1) was 70 rpm and 6 sec according to an experiment result, but can be varied depending on the performance of the motor.

After the predetermined time (T1) elapses, the microcomputer 45 changes the control method of the motor 43 to a torque control method (a current control)(step S55).

Accordingly, in case that the motor 43 is accelerated with a certain torque, a speed difference would occur in a predetermined time (T2) according to the weight of the laundry, based on which the laundry weight is detected (steps S56~S58). At this time, the predetermined time (T2) was 1~2 sec, but can be varied depending on the performance of the motor.

Namely, after the predetermined time (T2) elapses, the speed of the motor 43 differs according to the laundry weight, and the microcomputer 45 stores each speed in the memory, detects the laundry weight on the basis of the stored speeds, accordingly sets an accurate water supply amount and washing time and performs washing, without exceeding or falling short of the washing time.

As another method for detecting the laundry weight in the predetermined, time (T2), the microcomputer 45 stores a laundry weight according to the speed of the motor as a look-up table in the memory and determines a laundry weight by referring to the look-up table in the predetermined time (T2).

As so far described, the method for detecting a laundry weight in a washing machine employing the sensorless BLDC motor has an advantage that a laundry weight can be accurately measured and the laundry can be effectively washed even in an environment that a voltage is not regularly applied.

In addition, since the laundry weight detecting apparatus of a washing machine employing the sensorless BLDC motor does not include a hall sensor and its peripheral circuit, its construction is simple and thus its price can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, ace and therefore all changes and modifications that fall within the meets and bounds of the claims, or equivalence of such meets and bounds are therefore intended to be embraced by the appended claims.

What is claimed is:

1. A method for detecting a laundry weight in a washing machine employing a sensorless BLDC motor, the method comprising:

driving a motor and reaching a first predetermined motor speed, and determining whether a first predetermined time has elapsed; and accelerating the motor in a torque control mode for a second predetermined time after the first predetermined time has elapsed, and determining a laundry weight based on a motor speed determined after the second predetermined time has elapsed.

2. The method of claim 1, wherein the first predetermined time corresponds to an interval of time during which an error in a position detection of a rotor of the motor may be disregarded.

3. The method of claim 1, wherein the first predetermined speed is a speed at which an error in a position detection of a rotor of the motor may be disregarded.

4. The method of claim 1, wherein the second predetermined time corresponds to an interval of time sufficient to determine a laundry weight speed of the motor.

5. A method for detecting a laundry weight in a washing machine employing a sensorless BLDC motor, the method comprising:

initiating a motor and determining whether the motor reaches a first predetermined speed if a selected mode is a laundry weight detection mode;

when the motor reaches the first predetermined speed, determining whether a first predetermined time has elapsed, and then accelerating the motor in a torque control mode, thereafter storing a motor speed determined after a second predetermined time has elapsed; and determining a laundry weight based on the basis of the stored motor speed.

6. The method of claim s, wherein, determining a laundry weight, based on the stored motor speed means for detecting a laundry weight on the basis of the stored motor speed.

7. An method for determining a laundry weight in a washing machine employing a sensorless brushless direct current motor, the method comprising:

driving the motor until the motor reaches a first predetermined speed;

driving the motor at the first predetermined speed for a first predetermined interval of time;

accelerating the motor in a torque control mode for a second predetermined interval of time;

determining a speed of the motor at the end of the second predetermined interval of time; and determining a weight of the laundry based on the speed of the motor determined at the end of the second predetermined interval of time.

8. The method of claim 7, wherein determining a weight of the laundry based on the speed of the motor further comprises determining a weight of laundry also based on the first predetermined speed.

9. The method of claim 8, further comprising storing the speed of the motor and the first predetermined speed in a memory storage device of the washing machine.

10. The method of claim 9, wherein determining a weight of the laundry based on the speed of the motor further comprises referring to a look-up table after the second predetermined interval of time has elapsed, and determining a laundry weight based on a value in the look-up table.

11. The method of claim 7, wherein the first predetermined interval of time is long enough such that a position detection error of the motor unit will not impact a determination of laundry weight.

12. The method apparatus of claim 11, wherein the first predetermined interval of time is approximately six seconds.

13. The apparatus of claim 11, wherein the first predetermined speed is a speed which, when sustained for the first predetermined interval of time, will allow a laundry weight to be determined regardless of a position detection error of the motor.

14. The method of claim 13, wherein the first predetermined speed is approximately 70 revolutions per minute.

15. The method of claim 7, wherein controlling the motor in a torque control mode for a second predetermined interval of time comprises accelerating the motor.

16. The method of claim 15, wherein the second predetermined interval of time is between 1 and 2 seconds.

17. The method of claim 7, wherein a laundry weight is determined based on a difference in speed from the first predetermined interval of time to the end of the second predetermined interval of time.

* * * * *